United States Patent
Ahn et al.

(10) Patent No.: US 11,901,587 B2
(45) Date of Patent: Feb. 13, 2024

(54) BATTERY PACK

(71) Applicant: Samsung SDI Co., Ltd., Yongin-si (KR)

(72) Inventors: Jaepil Ahn, Yongin-si (KR); Shidong Park, Yongin-si (KR); Chuljung Yun, Yongin-si (KR); Jisoon Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 177 days.

(21) Appl. No.: 17/318,551

(22) Filed: May 12, 2021

(65) Prior Publication Data
US 2021/0359382 A1    Nov. 18, 2021

(30) Foreign Application Priority Data
May 13, 2020    (KR) ........................ 10-2020-0057199

(51) Int. Cl.
*H01M 50/552* (2021.01)
*H01M 50/553* (2021.01)
(Continued)

(52) U.S. Cl.
CPC ......... *H01M 50/561* (2021.01); *H01M 10/46* (2013.01); *H01M 50/553* (2021.01); *H02J 7/0013* (2013.01)

(58) Field of Classification Search
CPC .................. H01M 50/543–597; H01M 50/561
See application file for complete search history.

(56) References Cited

U.S. PATENT DOCUMENTS

| | | | | |
|---|---|---|---|---|
| 7,204,720 | B1 * | 4/2007 | Shiu | H01R 24/38 439/668 |
| 8,597,065 | B2 * | 12/2013 | Mounier | H01R 13/193 439/889 |

(Continued)

FOREIGN PATENT DOCUMENTS

| | | |
|---|---|---|
| CN | 201069848 Y | 6/2008 |
| CN | 102257654 A | 11/2011 |

(Continued)

OTHER PUBLICATIONS

Extended European Search Report dated Sep. 14, 2021 issued in corresponding EP Application No. 21173789.5, 6 pages.

(Continued)

*Primary Examiner* — Matthew T Martin
*Assistant Examiner* — Unique Jenevieve Luna
(74) *Attorney, Agent, or Firm* — Lewis Roca Rothgerber Christie LLP

(57) ABSTRACT

A battery pack includes a battery cell, an input/output terminal to/from which a charging/discharging current of the battery cell is to be inputted/outputted, and a connector detachably connected to the input/output terminal, and the input/output terminal includes a first hollow conductive member protruding in a first direction and a second hollow conductive member protruding to surround an outer periphery of the first hollow conductive member, the connector includes a central guide protruding in a second direction opposite to the first direction and a third hollow conductive member protruding to surround the outer periphery of the central guide, the central guide is fitted into a hollow portion of the first hollow conductive member, and the third hollow conductive member is fitted into a space between the first and second hollow conductive members and is electrically (Continued)

connected to the first and second hollow conductive members by an elastic connection member.

22 Claims, 11 Drawing Sheets

(51) Int. Cl.
*H01M 10/46* (2006.01)
*H02J 7/00* (2006.01)

(56) References Cited

U.S. PATENT DOCUMENTS

| | | | |
|---|---|---|---|
| 9,017,857 | B2 | 4/2015 | Lee et al. |
| 9,515,431 | B2 | 12/2016 | Kim et al. |
| 10,581,035 | B2 | 3/2020 | Yu et al. |
| 10,938,013 | B2 | 3/2021 | Jeon |
| 11,127,989 | B2 * | 9/2021 | Cheon ............... H01M 50/213 |
| 2015/0140393 | A1 | 5/2015 | Yamamoto et al. |
| 2019/0067843 | A1 * | 2/2019 | Menez ............... H01M 10/6556 |
| 2019/0157778 | A1 * | 5/2019 | Barthelmes ........ H01R 13/6582 |
| 2019/0386432 | A1 | 12/2019 | Aoshima |
| 2020/0127255 | A1 | 4/2020 | Moon et al. |

FOREIGN PATENT DOCUMENTS

| | | |
|---|---|---|
| CN | 104488111 A | 4/2015 |
| CN | 204516833 U | 7/2015 |
| CN | 206673014 U | 11/2017 |
| CN | 206806418 U | 12/2017 |
| CN | 107615517 A | 1/2018 |
| CN | 207800746 U | 8/2018 |
| CN | 109478617 A | 3/2019 |
| CN | 111081928 A | 4/2020 |
| EP | 2 871 695 A1 | 5/2015 |
| EP | 3 572 268 A1 | 11/2019 |
| EP | 3 641 008 A1 | 4/2020 |
| JP | 3080538 U | 9/2001 |
| JP | 2013-004185 A | 1/2013 |
| JP | 2017-195056 A | 10/2017 |
| JP | 2018-081780 A | 5/2018 |
| KR | 10-1806558 B1 | 1/2018 |

OTHER PUBLICATIONS

Chinese Office Action dated Dec. 27, 2022 issued in corresponding Chinese Patent Application No. 202110510813.5 (24 pages, including 13 pages of English translation).
European Office Action dated Jun. 21, 2023, issued in corresponding European Patent Application No. 21173789.5 (4 pages).

* cited by examiner

BATTERY PACK

CROSS-REFERENCE TO RELATED APPLICATION

This application claims priority to and the benefit of Korean Patent Application No. 10-2020-0057199, filed on May 13, 2020 in the Korean Intellectual Property Office, the entire disclosure of which is incorporated by reference herein.

BACKGROUND

1. Field

Aspects of one or more embodiments relate to a battery pack.

2. Description of the Related Art

Generally, secondary batteries are batteries capable of being charged and discharged, unlike primary batteries that are not capable of being charged. Secondary batteries are used as energy sources for mobile devices, electric vehicles, hybrid vehicles, and uninterruptible power supplies, for example, and may be used in the form of a single battery cell depending on the type of external device applied. Secondary batteries are also used in the form of a battery pack in which a plurality of battery cells are connected and grouped into one unit.

Small mobile devices, such as mobile phones, can operate for a certain period of time with the output and capacity of a single cell, but when long-term driving or high-power driving is required, such as for electric vehicles and hybrid vehicles that consume a lot of power, the battery pack is preferred due to problems of output and capacity, and the battery pack can increase the output voltage or output current depending on the number of built-in battery cells.

SUMMARY

According to an aspect of one or more embodiments, a battery pack is provided in which a connection structure between an input/output terminal connected to a group of battery cells and a connector connected to an external load, an external charger, or another group of battery cells, is improved such that the connection structure may be simplified, a number of components and cost may be reduced, and reliability of an electrical connection may be improved.

According to one or more embodiments, a battery pack includes: a battery cell, an input/output terminal to/from which a charging/discharging current of the battery cell is to be inputted/outputted, and a connector detachably connected to the input/output terminal, wherein the input/output terminal includes a first hollow conductive member protruding in a first direction and a second hollow conductive member protruding to surround an outer periphery of the first hollow conductive member, the connector includes a central guide protruding in a second direction opposite to the first direction and a third hollow conductive member protruding to surround the outer periphery of the central guide, the central guide is fitted into a hollow portion of the first hollow conductive member, and the third hollow conductive member is fitted into a space between the first and second hollow conductive members and is electrically connected to the first and second hollow conductive members by an elastic connection member arranged in the space.

The elastic connection member may include a disk member and an inner ring elastic piece and an outer ring elastic piece protruding from an inner ring and an outer ring of the disk member, respectively, in the first direction.

The inner ring elastic piece may come into contact with an outer circumference of the first hollow conductive member and an inner circumference of the third hollow conductive member, and the outer ring elastic piece may come into contact with an outer circumference of the third hollow conductive member and an inner circumference of the second hollow conductive member.

A plurality of elastic contact portions may be bent so as to protrude toward the outer circumference of the first hollow conductive member or the inner circumference of the third hollow conductive member in a longitudinal direction of the inner ring elastic piece.

A plurality of elastic contact portions may be bent so as to protrude toward the outer circumference of the third hollow conductive member or the inner circumference of the second hollow conductive member in a longitudinal direction of the outer ring elastic piece.

The disk member may include a connection piece between the inner ring and the outer ring of the disk member so as to connect therebetween.

The connection piece may come into contact with a longitudinal cross-section of the third hollow conductive member in the second direction.

The connection piece may include an elastic contact portion having a protruding shape between the inner ring and the outer ring of the disk member.

The inner ring elastic piece, the outer ring elastic piece, and the connection piece of the elastic connection member may be integrally formed as a strip member.

While consecutively surrounding the inner ring and the outer ring arranged in a concentric circular shape, the strip member may form the connection piece between the inner ring and the outer ring, the inner ring elastic piece that is bent to surround the inner ring from the connection piece and may protrude in the first direction, and the outer ring elastic piece that is bent to surround the outer ring from the connection piece and protrudes in the first direction.

A cutting portion may be formed at a position in a circumferential direction of the disk member.

An insulating protective cap may be arranged at an end portion of a central guide in the second direction.

An end portion of the central guide or an end of the protective cap may protrude further than an end portion of the third hollow conductive member in the second direction.

In the connector and the input/output terminal approaching each other in the first and second directions relative to each other, after the central guide of the connector is fitted into the hollow portion of the first hollow conductive member of the input/output terminal, the third hollow conductive member of the connector may be fitted into the space between the first and second hollow conductive members and of the input/output terminal.

The input/output terminal may further include an insulating housing that surrounds an outer periphery of the second hollow conductive member and has a coupling portion for sliding coupling with the connector thereon.

The coupling portion may include a pair of coupling portions at two positions facing each other in a circumferential direction of the insulating housing.

The coupling portion may include a pair of guide ribs configured to guide sliding of the connector, and a locking jaw between the pair of guide ribs.

The connector may further include an insulating cap that surrounds an outer periphery of the third hollow conductive member and includes a lever member for detachable coupling with the input/output terminal.

The lever member may include a pair of lever members at facing positions in a circumferential direction of the insulating cap and corresponding to the coupling portion of the insulating housing.

The lever member may include a first end on which an operation portion is formed, and a second end on which the coupling hook fitted into the locking jaw of the insulating housing according to an operation of the operation portion is formed.

The lever member may, through a first operation of pulling the pair of operation portions formed at the first end of the lever member toward each other, the pair of the coupling hooks formed at the second end may be retreated in a direction away from each other, and the first operation on the pair of operation portions formed at the first end of the lever member may be released according to sliding assembly of the insulating cap, such that the pair of coupling hooks formed at the second end approach each other and are coupled to the locking jaw of the insulating housing.

The lever member may further include a hinge portion between the operation portion at the first end and the coupling hook at the second end.

A pair of operation portions at one end position and a pair of coupling hooks at the other end position may approach or retreat in opposite directions with respect to the hinge portion.

The lever member may be separated from a main body of the insulating cap through the cutting portion and may be connected to the main body of the insulating cap through the hinge portion.

The central guide and the third hollow conductive member may protrude from the base portion of the connector in the second direction, and a screw member coupling a base portion and a conductive bar may protrude from the base portion of the connector in the first direction.

The conductive bar may form a charge/discharge path on which a charging/discharging current is to flow between the plurality of battery cells and an external load, an external charger, or another plurality of battery cells.

DETAILED DESCRIPTION

Figure 1:
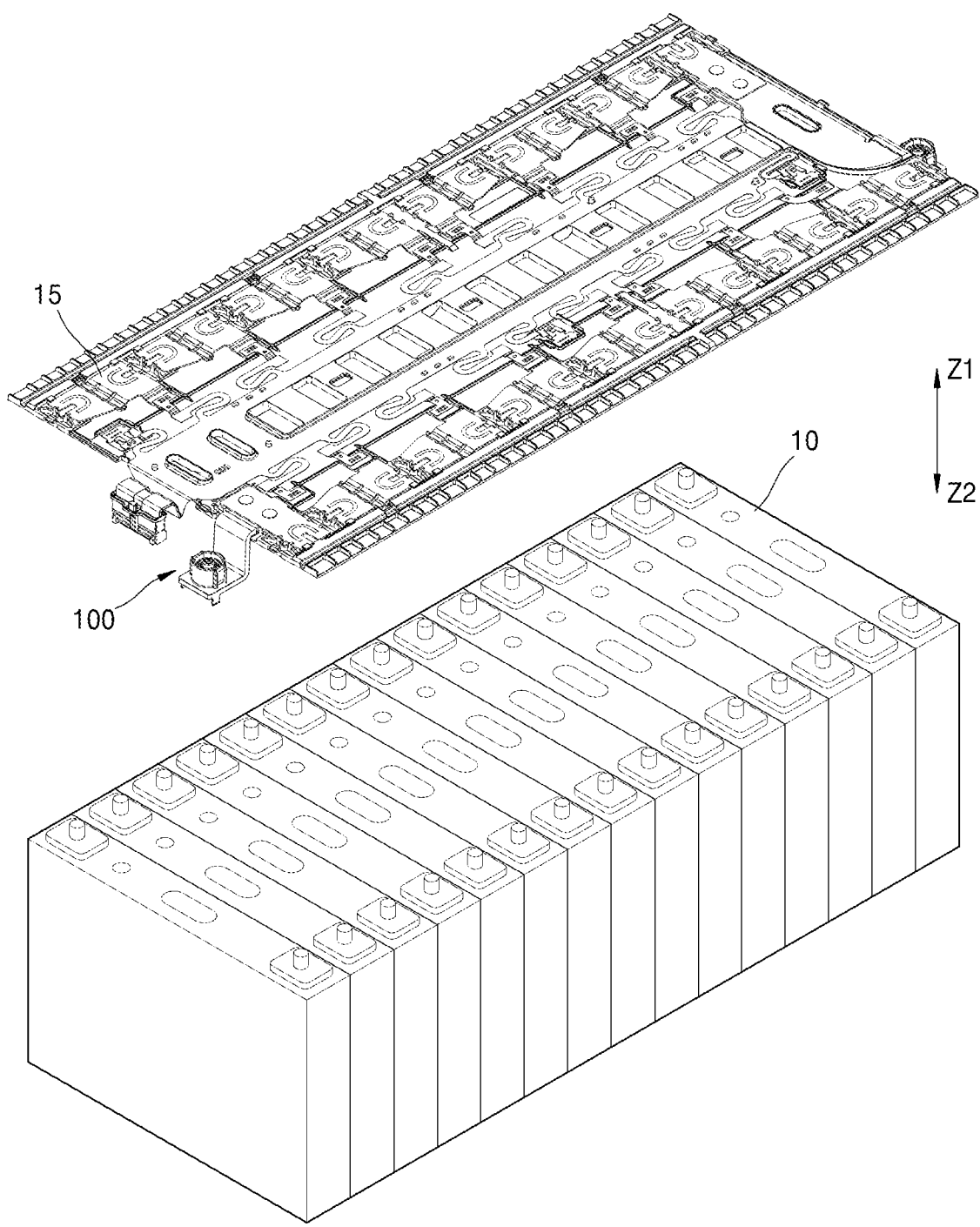
FIG. 1 is an exploded perspective view of a battery pack according to an embodiment.

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the singular forms "a," "an," and "the" are intended to include the plural forms as well, unless the context clearly indicates otherwise.

It is to be understood that the terms "comprise," "include," and "have" used herein specify the presence of stated features or components, but do not preclude the presence or addition of one or more other features or components.

Sizes of components in the drawings may be exaggerated for convenience of description. In other words, since the sizes and thicknesses of components in the drawings may be arbitrarily illustrated for convenience of description, the following embodiments are not limited thereto.

It is to be understood that when a layer, region, or component is referred to as being "connected to" another layer, region, or component, it may be directly connected to the other layer, region, or component or may be indirectly connected to the other layer, region, or component with one or more intervening layers, regions, or components interposed therebetween. For example, it is to be understood that when a layer, region, or component is referred to as being "electrically connected to" another layer, region, or component, it may be directly electrically connected to the other layer, region, or component or may be indirectly electrically connected to the other layer, region, or component with one or more intervening layers, regions, or components interposed therebetween.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Herein, a battery pack according to some embodiments will be described with reference to the accompanying drawings.

Figure 2:
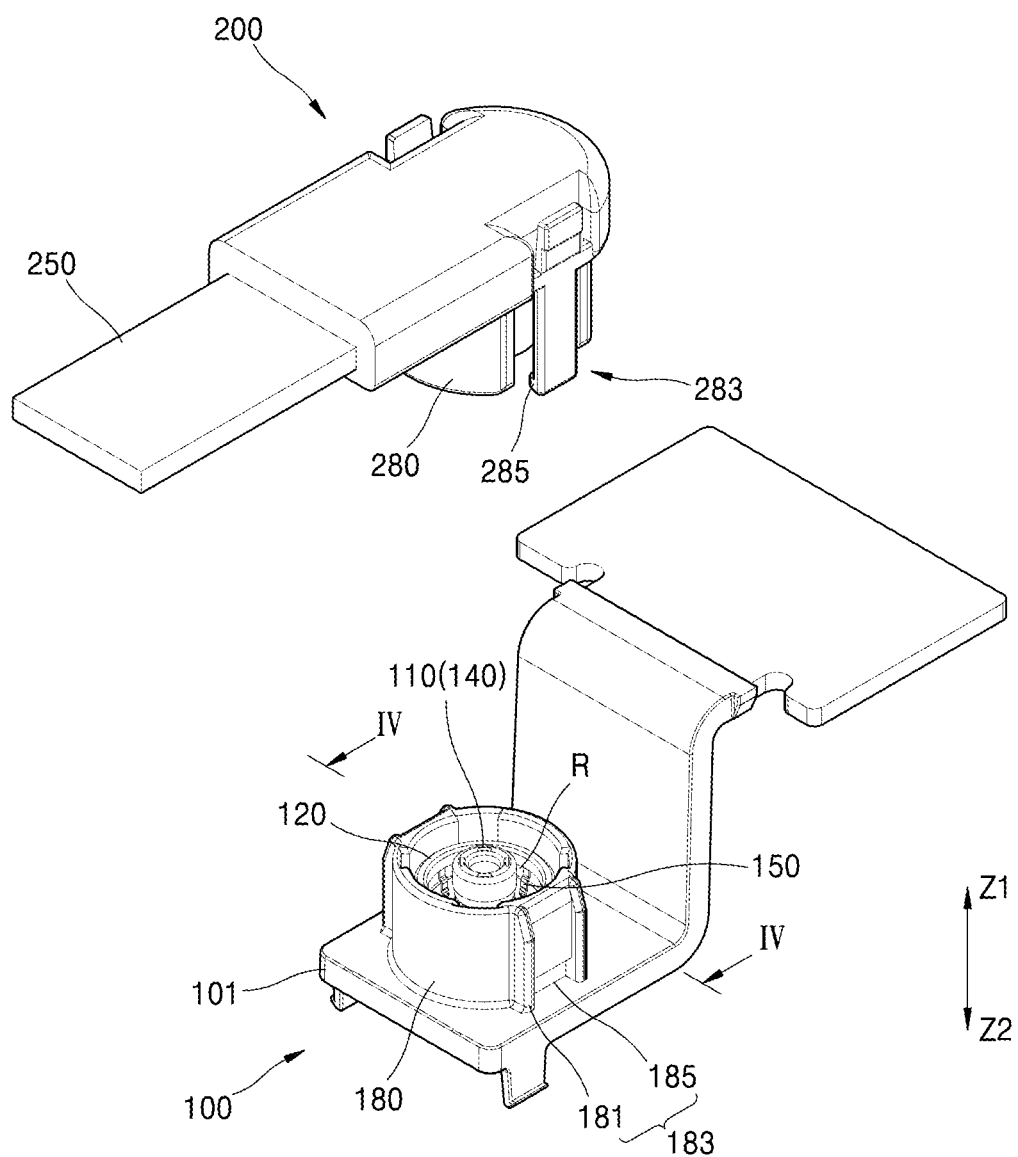
FIG. 2 is a perspective view of a connection structure between an input/output terminal and a connector of the battery pack shown in FIG. 1.
Figure 3:
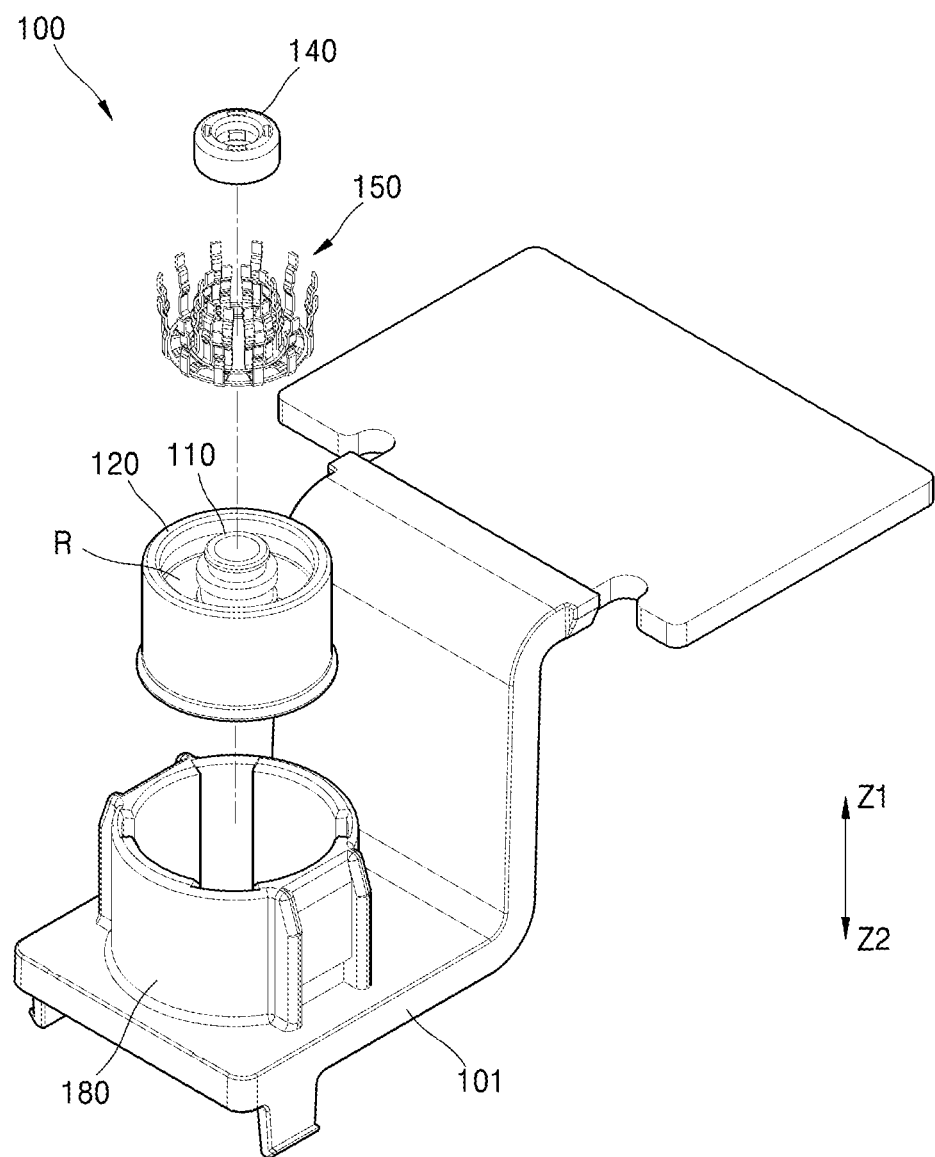
FIG. 3 is an exploded perspective view of the input/output terminal shown in FIG. 2.
Figure 4:
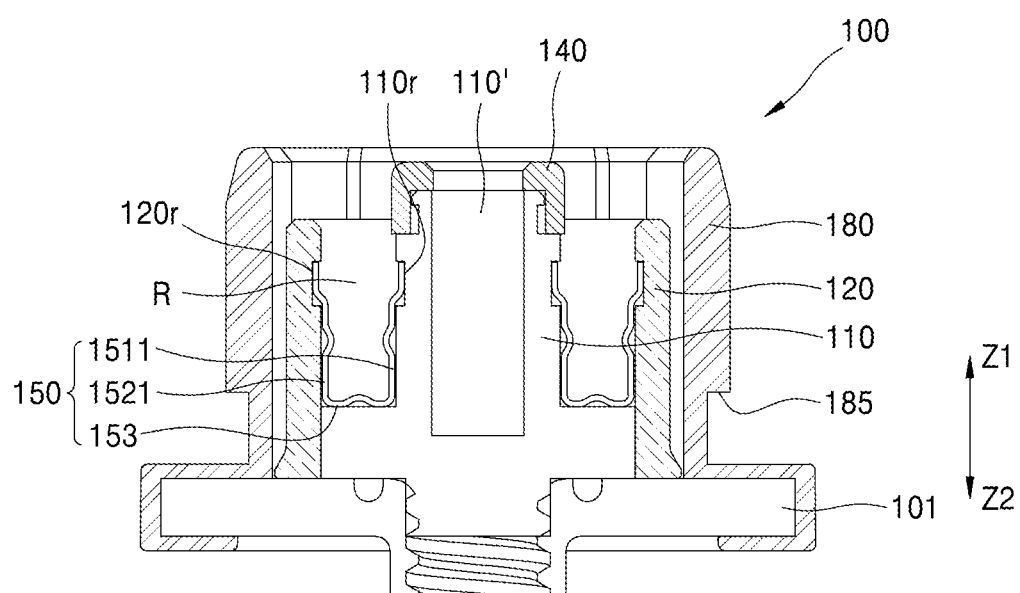
FIG. 4 is a cross-sectional view of the input/output terminal taken along the line IV-IV of FIG. 2.

FIG. 1 is an exploded perspective view of a battery pack according to an embodiment. FIG. 2 is a perspective view of a connection structure between an input/output terminal and a connector of the battery pack shown in FIG. 1. FIG. 3 is an exploded perspective view of the input/output terminal shown in FIG. 2. FIG. 4 is a cross-sectional view of the input/output terminal taken along the line IV-IV of FIG. 2.

Figure 5:
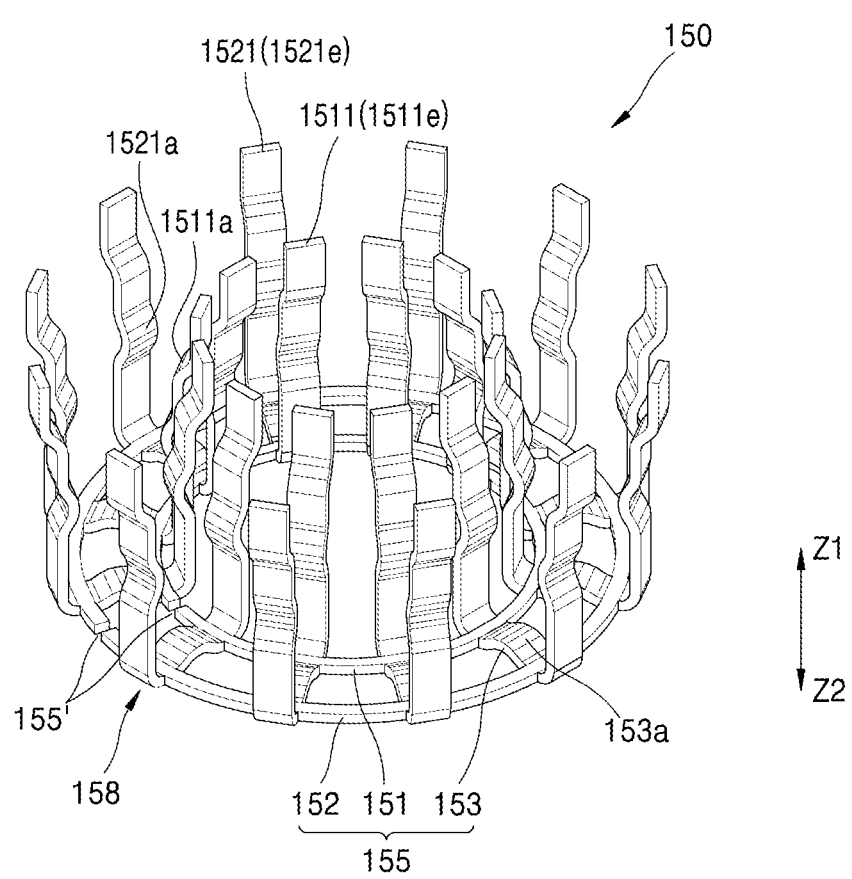
FIG. 5 is a perspective view of an elastic connection member shown in FIG. 3.
Figure 6:
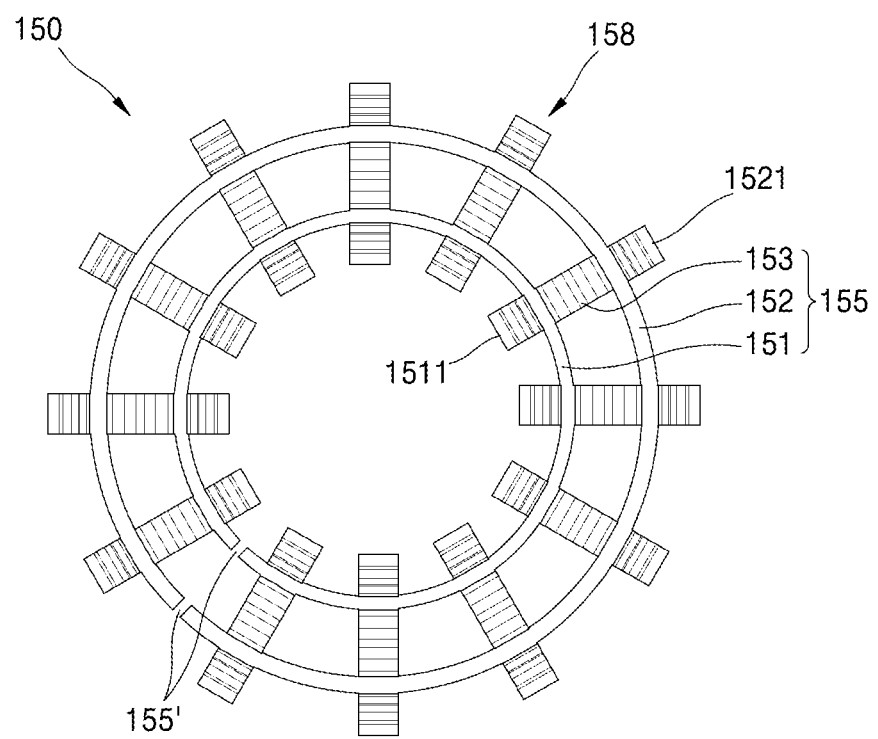
FIG. 6 is a plan view of the elastic connection member shown in FIG. 3.
Figure 7:
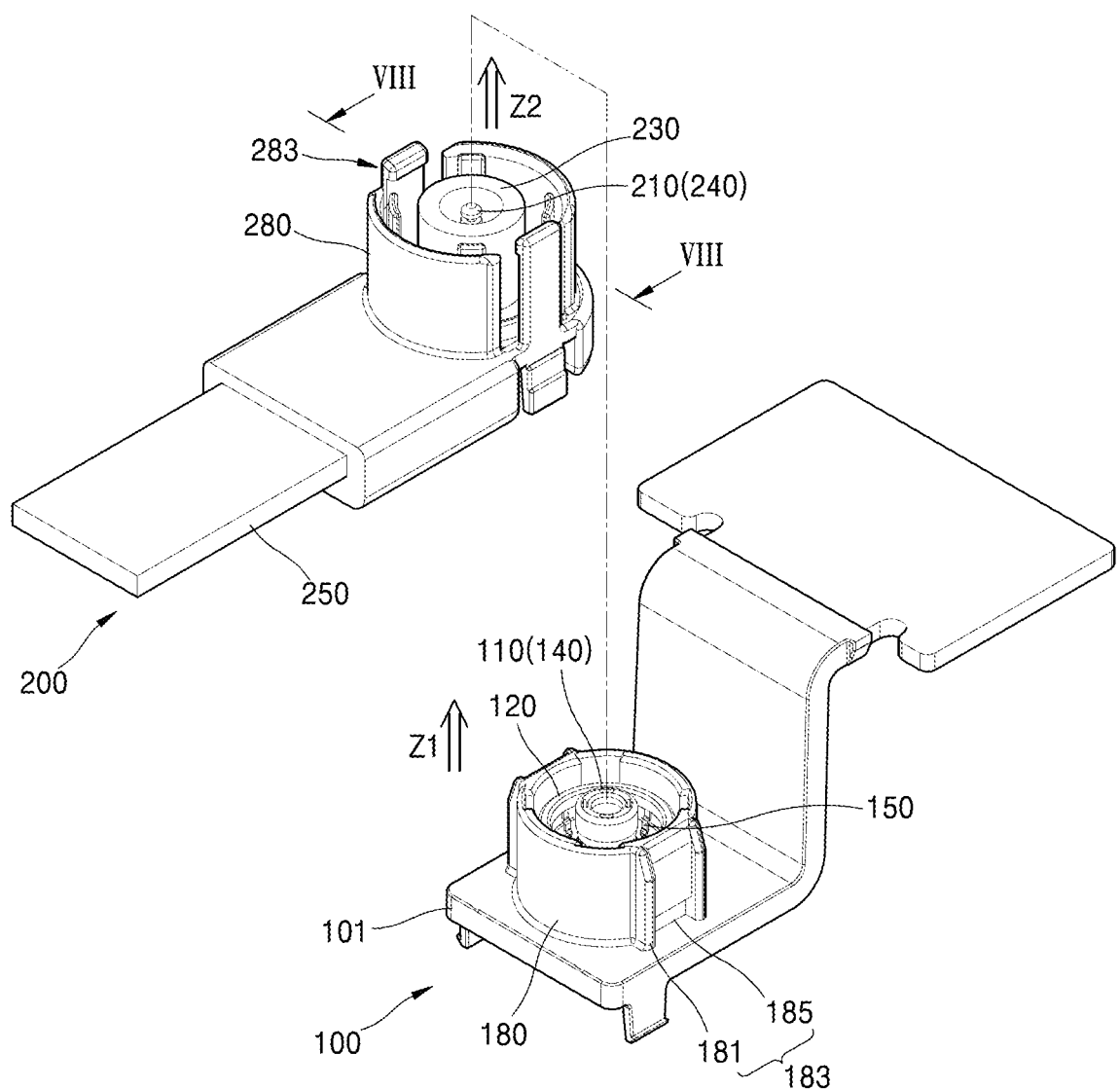
FIG. 7 is another perspective view of a connection structure between the input/output terminal and the connector of the battery pack shown in FIG. 1.
Figure 8:
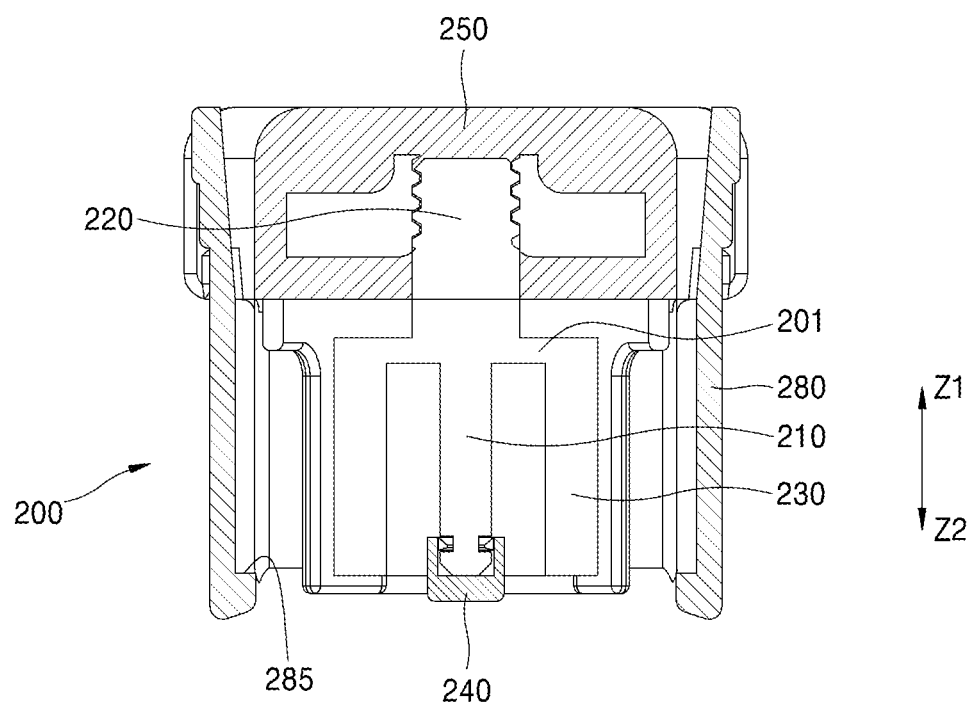
FIG. 8 is a cross-sectional view of the connector taken along the line VIII-VIII of FIG. 7.
Figure 9:
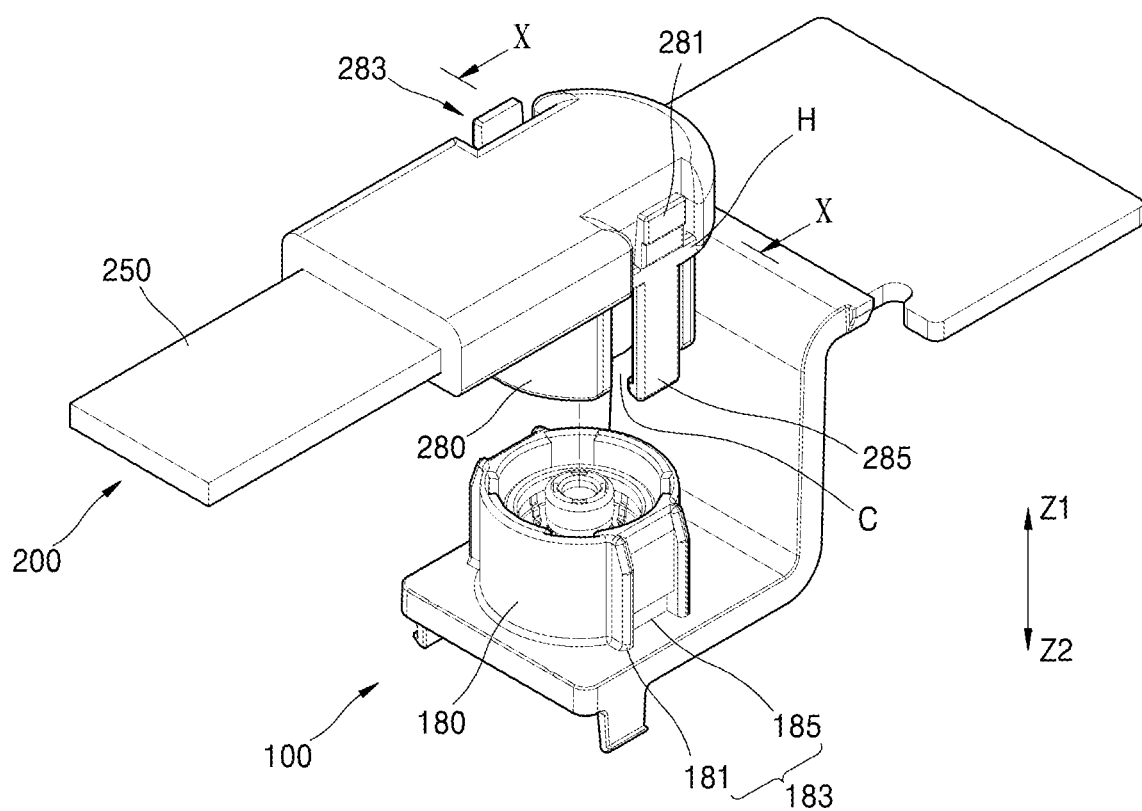
FIG. 9 is another perspective view of a connection structure between the input/output terminal and the connector of the battery pack shown in FIG. 1.
Figure 10:
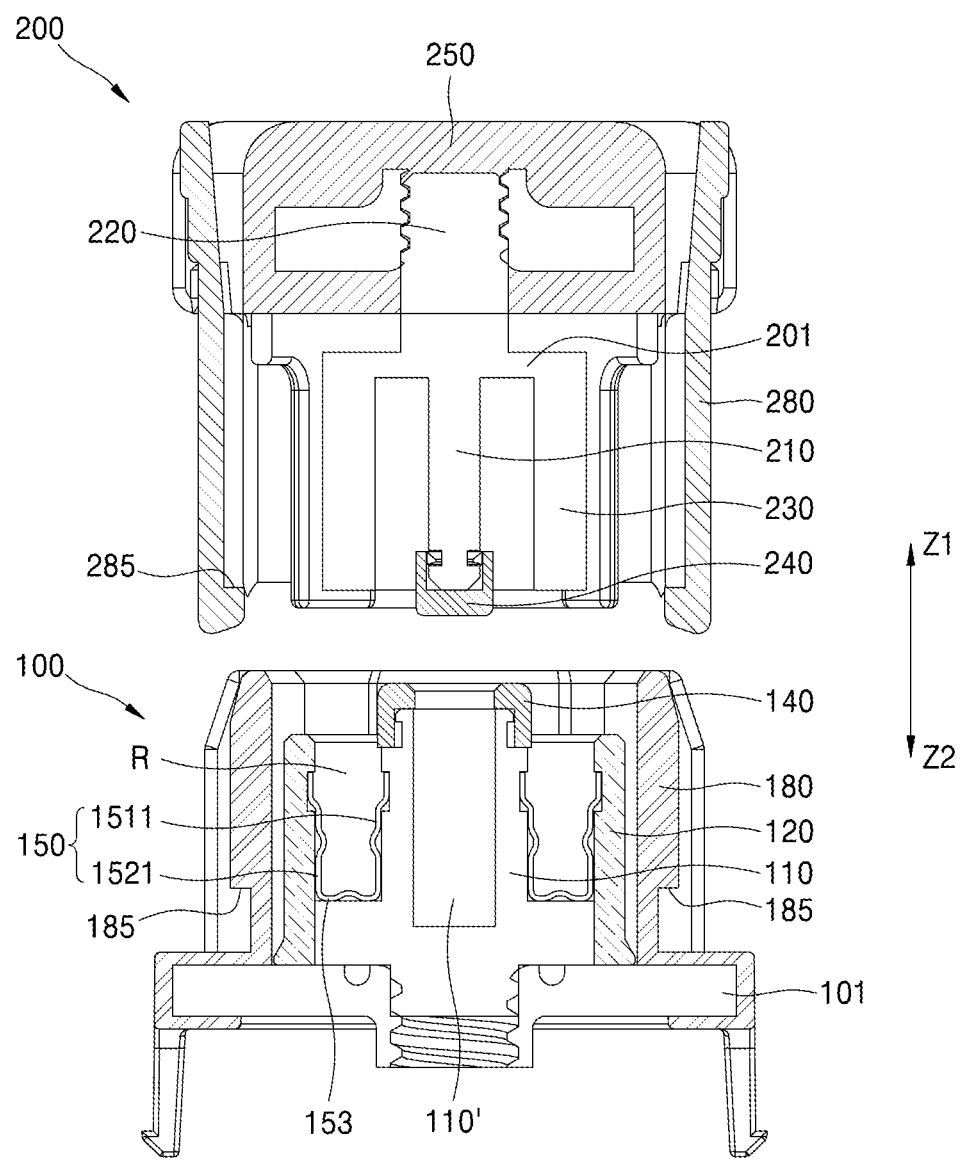
FIGS. 10 and 11 are cross-sectional views of the input/output terminal and the connector taken along the line X-X of FIG. 9, illustrating states before and after connection, respectively.
Figure 11:
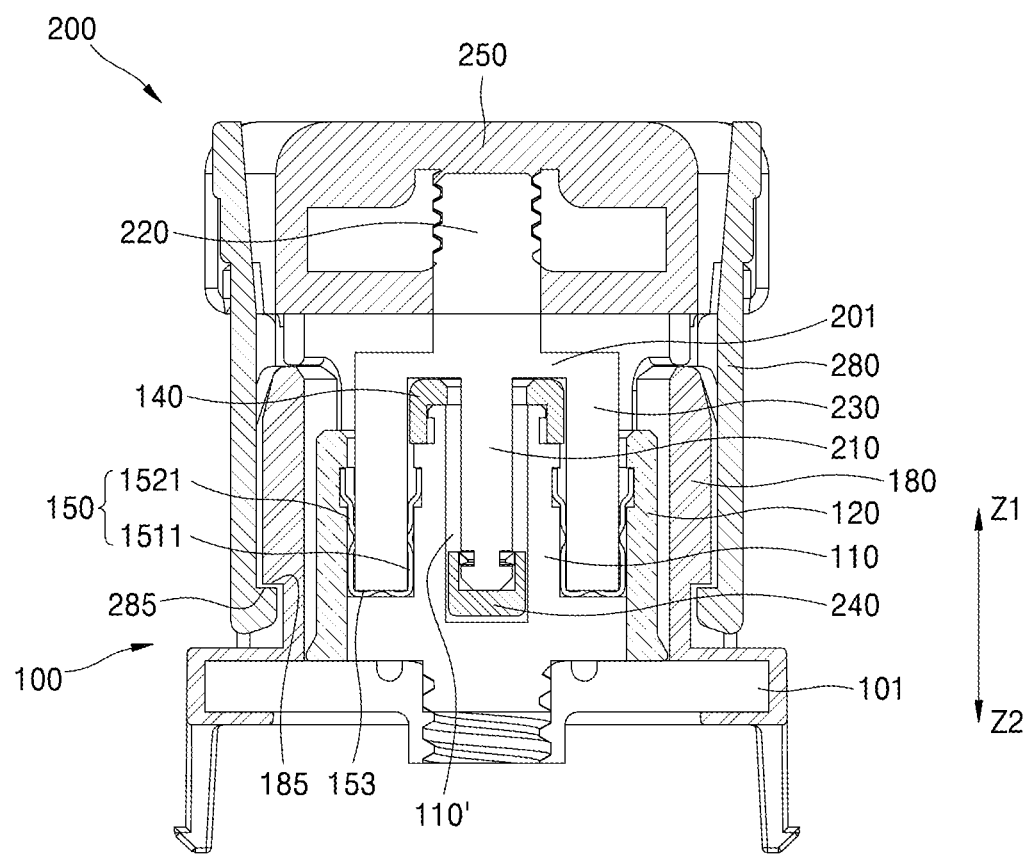

FIG. 5 is a perspective view of an elastic connection member shown in FIG. 3. FIG. 6 is a plan view of the elastic connection member shown in FIG. 3. FIG. 7 is another perspective view of a connection structure between the input/output terminal and the connector of the battery pack shown in FIG. 1. FIG. 8 is a cross-sectional view of the connector taken along the line VIII-VIII of FIG. 7. FIG. 9 is another perspective view of a connection structure between the input/output terminal and the connector of the battery pack shown in FIG. 1. FIGS. 10 and 11 are cross-sectional views of the input/output terminal and the connector taken along the line X-X of FIG. 9, illustrating states before and after connection, respectively.

Referring to FIGS. 1 and 2, a battery pack according to an embodiment may include a plurality of battery cells 10 electrically connected to each other, an input/output terminal 100 through which charging/discharging currents of the plurality of battery cells 10 are inputted/outputted, and a connector 200 detachably connected to the input/output terminal 100.

The battery pack according to an embodiment may include a plurality of battery cells 10. For example, the plurality of battery cells 10 that constitute the battery pack may be electrically connected to each other via a bus bar 15. For example, in an embodiment, the adjacent battery cells 10 may be electrically connected to each other via the bus bar 15. The input/output terminal 100 may be connected to both end battery cells 10 among the plurality of battery cells 10 electrically connected to each other. For example, the input/output terminal 100 may be directly connected to an electrode having a lowest potential of one end of the battery cells 10 forming both ends of a charge/discharge path of the battery cells 10 electrically connected to each other and an electrode having a highest potential of the other end of the battery cells 10, or may be connected to the bus bar 15 connected to the electrode of the lowest potential and the electrode of the highest potential.

In an embodiment, the input/output terminal 100 and the connector 200 may be detachably coupled and electrically connected to each other, and the input/output terminal 100 connected to a group of the battery cells 10, an external load (not shown), an external charger (not shown), or the connector 200 (a conductive bar 250 of the connector 200) connected to another group of the battery cells 10 may be connected to each other such that the charge/discharge path of the battery cell 10 may be provided.

Referring to FIGS. 2 through 4, the input/output terminal 100 may include a base portion 101 formed in a plate shape, a first hollow conductive member 110 protruding from the base portion 101 in a first direction Z1 and protruding from a central position of the base portion 101, and a second hollow conductive member 120 protruding to surround (surround or partially surround) an outer periphery of the first hollow conductive member 110. For example, the first and second hollow conductive members 110 and 120 may be formed in a concentric circular shape on the base portion 101 and may protrude in parallel in the first direction Z1 in the concentric circular shape. For example, the first hollow conductive member 110 may be formed in a circular shape to have a first radius from the central position of the base portion 101, and the second hollow conductive member 120 may be formed in a circular shape to have a second radius from the central position of the base portion 101. In an embodiment, the first and second hollow conductive members 110 and 120 may be formed in a generally circular shape to have the first and second radii, but, in an embodiment, may include a portion partially deviating from a circular trajectory, rather than being formed in a completely circular shape following the first and second radii.

An insulating protective cap 140 may be formed at an end portion of the first hollow conductive member 110 in the first direction Z1. The protective cap 140 may surround the end portion of the first hollow conductive member 110 and may insulate the end portion of the first hollow conductive member 110, thereby eliminating or reducing a risk of electric shock through the input/output terminal 100. For example, even if an external foreign substance or a part of the human body comes into contact with the end portion of the first hollow conductive member 110 in the first direction Z1, electricity through the external foreign substance or the human body may be prevented or substantially prevented through the insulating protective cap 140 surrounding the end portion of the first hollow conductive member 110, and the risk of electric shock may be blocked or mitigated. The end portion of the first hollow conductive member 110 on which the protective cap 140 is formed may be formed at a position protruding further in the first direction Z1 than an end portion of the second hollow conductive member 120. In other words, the end portion of the first hollow conductive member 110 or an end of the protective cap 140 may protrude further than the end portion of the second hollow conductive member 120 in the first direction Z1.

A recess space R may be formed between the first and second hollow conductive members 110 and 120. The recess space R may correspond to a space between an outer circumference of the first hollow conductive member 110 and an inner circumference of the second hollow conductive member 120. For example, the recess space R may be formed in a space having a hollow cylindrical shape formed between the first hollow conductive member 110 having a first radius and the second hollow conductive member 120 having a second radius. In this case, the hollow cylindrical shaped space may be defined as a space between the first radius and the second radius.

An elastic connection member 150 may be seated in the recess space R.

Referring to FIG. 5, the elastic connection member 150 may include a disk member 155 arranged in parallel with the base portion 101, and an inner ring elastic piece 1511 and an outer ring elastic piece 1521, which protrude from an inner ring 151 and an outer ring 152 of the disk member 155, respectively, in the first direction Z1. In an embodiment, the inner ring elastic piece 1511 may come into contact with an outer circumference of the first hollow conductive member 110, and the outer ring elastic piece 1521 may come into contact with an inner circumference of the second hollow conductive member 120.

As illustrated in FIGS. 10 and 11, a third hollow conductive member 230 of the connector 200 may be inserted into the recess space R, and a conductive connection between the first and second hollow conductive members 110 and 120 may be formed through the elastic connection member 150 seated in the recess space R while the third hollow conductive member 230 is accommodated in the recess space R between the first and second hollow conductive members 110 and 120. That is, the inner ring elastic piece 1511 of the elastic connection member 150 may be interposed between the first and third hollow conductive members 110 and 230 and between the outer circumference of the first hollow conductive member 110 and the inner circumference of the third hollow conductive member 230. Also, the outer ring elastic piece 1521 of the elastic connection member 150 may be interposed between the second and third hollow conductive members 120 and 230 and between the outer circumference of the third hollow conductive member 230 and the inner circumference of the second hollow conductive member 120.

The first and third hollow conductive members 110 and 230 may form a conductive connection by interposing the inner ring elastic piece 1511 therebetween.

To this end, a plurality of elastic contact portions (see 1511a of FIG. 5) may be formed in a longitudinal direction of the inner ring elastic piece 1511. In other words, a plurality of elastic contact portions (see 1511a of FIG. 5) that are bent to protrude toward the outer circumference of the first hollow conductive member 110 or the inner circumference of the third hollow conductive member 230 may be formed in the longitudinal direction of the inner ring elastic piece 1511.

For example, the plurality of elastic contact portions 1511a may protrude in a radial direction in which the first and third hollow conductive members 110 and 230 face each other and may come into contact with any of the first and third hollow conductive members 110 and 230. For example, an elastic contact portion 1511a that comes into contact with an outer circumference of the first hollow conductive member 110 and an elastic contact portion 1511a that comes into contact with an inner circumference of the third hollow conductive member 230 may be formed at different positions in the longitudinal direction of the inner ring elastic piece 1511.

The second and third hollow conductive members 120 and 230 may form a conductive connection by interposing the outer ring elastic piece 1521 therebetween. To this end, a plurality of elastic contact portions (see 1521a of FIG. 5) may be formed in the longitudinal direction of the outer ring elastic piece 1521. In other words, a plurality of elastic contact portions (see 1521a of FIG. 5) that are bent to protrude toward the outer circumference of the third hollow conductive member 230 or the inner circumference of the second hollow conductive member 120 may be formed in the longitudinal direction of the outer ring elastic piece 1521.

For example, the plurality of elastic contact portions 1521a may protrude in a radial direction in which the second and third hollow conductive members 120 and 230 face each other, and may come into contact with any of the second and third hollow conductive members 120 and 230. For example, an elastic contact portion 1521a that comes into contact with the outer circumference of the third hollow conductive member 230 and an elastic contact portion 1521a that comes into contact with the inner circumference of the second hollow conductive member 120 may be formed in the longitudinal direction of the outer ring elastic piece 1521.

Referring to FIG. 5, the inner ring elastic piece 1511 and the outer ring elastic piece 1521 may be formed at different positions by interposing the disk member 155 therebetween. For example, a plurality of inner ring elastic pieces 1511 and a plurality of outer ring elastic pieces 1521 may be formed in the circumferential direction of the disk member 155 at positions in which they face each other. In an embodiment, the inner ring elastic piece 1511 may include a plurality of inner ring elastic pieces 1511 formed at positions equally spaced in a circumferential direction along the inner ring 151 of the disk member 155. Similarly, the outer ring elastic piece 1521 may include a plurality of outer ring elastic pieces 1521 formed at positions equally spaced in the circumferential direction along the outer ring 152 of the disk member 155.

A connection piece 153 connecting the inner ring 151 and the outer ring 152 of the disk member 155 may be formed between the inner ring 151 and the outer ring 152 of the disk member 155. As shown in FIGS. 10 and 11, the connection piece 153 may come into contact with a longitudinal cross-section of the third hollow conductive member 230 in the second direction Z2. To this end, the connection piece 153 may include an elastic contact portion 153a formed to protrude in the first direction Z1. For example, the connection piece 153 may include an elastic contact portion 153a that protrudes in the first direction Z1 between the inner ring 151 and the outer ring 152 of the disk member 155.

Referring to FIG. 5, in an embodiment, the inner ring elastic piece 1511, the outer ring elastic piece 1521, and the connection piece 153 of the elastic connection member 150 may be integrally formed as a strip member 158. For example, while surrounding (e.g., consecutively surrounding) the inner ring 151 and the outer ring 152 arranged in a concentric circular shape, the strip member 158 may include the connection piece 153 between the inner ring 151 and the outer ring 152, the inner ring elastic piece 1511 that is bent to surround the inner ring 151 from the connection piece 153 and protrudes in the first direction Z1, and the outer ring elastic piece 1521 that is bent to surround the outer ring 152 from the connection piece 153 and protrudes in the first direction Z1. In this case, the strip member 158 may include a plurality of elastic contact portions 1511a, 1521a, and 153a in the longitudinal direction, and the strip member 158 may come into contact with the first through third hollow conductive members 110, 120, and 230 through the elastic contact portions 1511a, 1521a, and 153a formed at different positions. For example, the strip member 158 may have approximately rectangular cross-sections and when a relatively long side of the strip member 158 among the rectangular cross-sections is bent, the strip member 158 may surround the inner ring 151 and the outer ring 152 or, when the long side of the strip member 158 is bent, the strip member 158 may form the elastic contact portions 1511a, 1521a, and 153a.

A bent portion, or cutting portion, 155' may be formed at a position in a circumferential direction of the disk member 155. The circumferential length of the disk member 155 may be variably reduced through the bent portion 155'. For example, when the disk member 155 is seated in the recess space R, both ends of the disk member 155 divided through the bent portion 155' overlap each other, and the circumferential length of the disk member 155 may be reduced to be suitable for the recess space R, and a clearance between the disk member 155 and the recess space R may be provided through the bent portion 155'.

The elastic connection member 150 may be arranged in the recess space R between the first and second hollow conductive members 110 and 120. With respect to the position of the elastic connection member 150, the disk member 155 of the elastic connection member 150 may be supported on the bottom of the recess space R, and ends 1511e and 1521e of the inner ring elastic piece 1511 and the outer ring elastic piece 1521 that protrude from the disk member 155 in the first direction Z1 may be fitted into a seating groove 110r (see FIG. 4) formed in the outer circumference of the first hollow conductive member 110 and a seating groove 120r (see FIG. 4) formed in the inner circumference of the second hollow conductive member 120, respectively, and may be fixed in position such that the disk member 155 of the elastic connection member 150 does not move in the recess space R.

Referring to FIG. 2, the input/output terminal 100 may include an insulating housing 180 that surrounds an outer periphery of the second hollow conductive member 120. The insulating housing 180 may electrically insulate and protect a component for forming an electrical connection, such as the first and second hollow conductive members 110 and 120 formed inside the input/output terminal 100 or the elastic connection member 150. For example, the insulating housing 180 may be formed in a generally concentric circular shape with the first and second hollow conductive members 110 and 120 so as to surround the outer peripheries of the first and second hollow conductive members 110 and 120.

A coupling portion 183 for coupling with the connector 200 may be formed on an outer wall of the insulating housing 180. In an embodiment, the coupling portion 183 may be formed in pairs at two positions facing away from each other in a circumferential direction of the insulating housing 180. In an embodiment, the coupling portion 183 may include a pair of guide ribs 181 for guiding a coupling hook 285 of the connector 200 that is slidably coupled along the coupling portion 183 and a locking projection or jaw 185 formed between the pair of guide ribs 181. The locking jaw 185 may be formed in a stepped step shape to fasten with the coupling hook 285 that slides along the pair of guide ribs 181. The outer wall of the insulating housing 180 may be formed in a generally cylindrical shape, and, in an embodiment, may be formed in a flatly chamfered shape at the position of the coupling portion 183 in which the locking jaw 185 is formed. The insulating housing 180 may surround the outer periphery of the second hollow conductive member 120, and a free space may be formed provided between the insulating housing 180 and the second hollow conductive member 120 such that deformation due to the pressing of the coupling hook 285 slidingly coupled along the outer wall of the insulating housing 180 may be accommodated in the free space. The locking jaw 185 of the input/output terminal 100 and the coupling hook 285 of the connector 200 may form physical coupling detachable while sliding with respect to each other, for example, hook coupling. The first and second hollow conductive members 110 and 120 of the input/output terminal 100 and the third hollow conductive member 230 of the connector 200 that are slidably coupled to each other may be electrically connected to each other by interposing the elastic connection member 150 therebetween. In this way, in an embodiment, the input/output terminal 100 and the connector 200 may form a physical connection and an electrical connection through sliding coupling to each other.

Referring to FIGS. 7 and 8, the connector 200 may include a base portion 201 formed in a generally plate shape, a central guide 210 that protrudes from the base portion 201 in a second direction Z2 opposite to the first direction Z1 and protrudes from a central position of the base portion 201, and the third hollow conductive member 230 that protrudes to surround an outer periphery of the central guide 210. For example, the central guide 210 and the third hollow conductive member 230 may protrude in parallel with each other in the second direction Z2.

Referring to FIG. 11, the central guide 210 may be fitted into a hollow portion 110' of the first hollow conductive member 110 of the input/output terminal 100 and may be guided such that sliding coupling between the connector 200 including the central guide 210 and the input terminal 100 including the first hollow conductive member 110 may not be misaligned through fitting coupling between the central guide 210 and the first hollow conductive member 110.

An insulating protective cap 240 may be formed at an end portion of the central guide 210 in the second direction Z2. The protective cap 240 may surround the end portion of the central guide 210 and may insulate the end portion of the central guide 210, thereby eliminating or reducing a risk of electric shock through the connector 200. For example, even if an external foreign substance or a part of the human body is in contact with the end portion of the central guide 210 in the second direction Z2, electricity through the external foreign substance or the human body may be prevented or substantially prevented, and the risk of electric shock may be blocked or reduced through the insulating protective cap 240 that surrounds the end portion of the central guide 210. In an embodiment, the end portion of the central guide 210 on which the protective cap 240 is formed may be formed at a position that protrudes further in the second direction Z2 than the end portion of the third hollow conductive member 230. In other words, the end portion of the central guide 210 or the end of the protective cap 240 may protrude further than the end portion of the third hollow conductive member 230 in the second direction Z2.

The third hollow conductive member 230 may be fitted into the recess space R provided between the first and second hollow conductive members 110 and 120 and may form an electrical connection with the first and second hollow conductive members 110 and 120 by interposing the elastic connection member 150 arranged in the recess space R. The third hollow conductive member 230 may be formed in a generally concentric circular shape with the first and second hollow conductive members 110 and 120 so as to be fitted between the outer circumference of the first hollow conductive member 110 and the inner circumference of the second hollow conductive member 120. In an embodiment, the first through third hollow conductive members 110, 120, 230 may be formed in a generally circular shape, but may include a portion partially deviating from the circular trajectory, rather than being formed in a completely circular shape of a concentric circle.

In the connector 200 and the input/output terminal 100 approaching each other in the first and second directions Z1 and Z2 relative to each other, after the central guide 210 of the connector 200 is fitted into the hollow portion 110' of the first hollow conductive member 110 of the input/output terminal 100, the third hollow conductive member 230 of the connector 200 is fitted into the recess space R between the first and second hollow conductive members 110 and 120 of the input/output terminal 100 such that the connector 200 and the input/output terminal 100 may be electrically connected to each other. For example, in the connector 200, the end portion (or the protective cap 240 formed at the end portion of the central guide 210) of the central guide 210 may be formed in a more protruding shape than the end portion of the third hollow conductive member 230. Thus, after the end portion of the central guide 210 is first fitted into the input/output terminal 100 (the hollow portion 110' of the first hollow conductive member 110), the third hollow conductive member 230 may be fitted into the input/output terminal 100 (the recess space R between the first and second hollow conducive members 110 and 120), and through this assembly structure, assembly between the input/output terminal 100 and the connector 200 may not deviate from a sliding trajectory according to the guidance of the central guide 210.

Referring to FIGS. 7 and 9, the connector 200 may include an insulating cap 280 that surrounds the outer periphery of the third hollow conductive member 230. The insulating cap 280 may electrically insulate and protect a component for forming an electrical connection, such as the central guide 210 or the third hollow conductive member 230 formed inside the connector 200. For example, the insulating cap 280 may include a portion formed in a generally concentric circular shape with the third hollow conductive member 230 so as to surround the outer periphery of the third hollow conductive member 230. In an embodiment, with respect to coupling between the connector 200 and the input/output terminal 100, the connector 200 and the input/output terminal 100 may be coupled to each other such that the insulating cap 280 of the connector 200 covers the outer wall of the insulating housing 180 of the input/output terminal 100. In this case, the insulating cap 280 and the insulating housing 180 may be detachably coupled to each other. In an embodiment, a lever member 283 for providing detachable coupling with the insulating housing 180 may be formed on the insulating cap 280. The lever member 283 may include a first end on which an operation portion 281 is formed, and a second end on which the coupling hook 285 is fitted into the locking jaw 185 of the insulating housing 180 according to the operation of the operation portion 281. In an embodiment, the lever member 283 may be formed in pairs at positions facing each other in a circumferential direction of the insulating cap 280, and the lever member 283 of the insulating cap 280 may be formed at a position corresponding to the coupling portion 183 of the insulating cap 180. Through a first operation of pulling the pair of operation portions 281 formed at the first end position of the lever member 283 toward each other, the pair of the coupling hooks 285 formed at the second end position may be retreated in a direction away from each other, and after the coupling hook 285 of the insulating cap 280 reaches the position of the locking jaw 185 of the insulating housing 180, the first operation on the pair of operation portions 281 formed at the first end position of the lever member 285 may be released according to sliding assembly of the insulating cap 280 and the insulating housing 180, such that the pair of coupling hooks 285 formed at the second end approach each other and are coupled to the locking jaw 185 of the insulating housing 180 and, thus, coupling between the insulating cap 280 and the insulating housing 180 may be performed.

The lever member 283 may further include a hinge portion H formed between the operation portion 281 at the first end position and the coupling hook 285 at the second end position, and the pair of operation portions 281 at the first end position and the pair of coupling hooks 285 at the second end position may approach or retreat in opposite directions, with respect to the hinge portion H. In an embodiment, the lever member 283 may be separated from a main body of the insulating cap 280 through a cutting portion C. Thus, the approaching or retreating motion of the pair of coupling hooks 285 with respect to each other according to the first operation of the lever member 283 and releasing of the first operation may be performed. Also, the lever member 283 may be connected to the main body of the insulating cap 280 through the hinge portion H. Thus, the lever member 283 may be formed as a part of the insulating cap 280 through the hinge portion H. The operation portion 281 at the first end and the coupling hook 285 at the second end formed at opposite sides with respect to the hinge portion H may be linked in opposite directions.

Referring to FIG. 8, in the connector 200, the central guide 210 and the third hollow conductive member 230 may be electrically connected to the conductive member 250 through the base portion 201 for providing a support base thereof. For example, the base portion 201 and the conductive bar 250 may be connected to each other through screw coupling. In an embodiment, the central guide 210 and the third hollow conductive member 230 may protrude from the base portion 201 in the second direction Z2, and a screw member 220 may protrude in the first direction Z1 opposite to the second direction Z2, and the base portion 201 and the conductive bar 250 may be electrically connected to each other through the screw member 220 protruding from the base portion 201. The connector 200 may be electrically connected to an external load, an external charger, or another group of battery cells 10 through the conductive bar 250 and may be coupled to the input/output terminal 100 connected to one group of battery cells 10 such that the input/output terminal 100 and the connector 200 or the conductive bar 250 of the connector 200 may form a charge/discharge path of the battery cell 10. In other words, the conductive bar 250 may form a charge/discharge path on which a charging/discharging current flows between one group of battery cells 10 and the external load, the external charger, or another group of battery cells 10.

In a battery pack according to one or more embodiments, a connection structure between an input/output terminal connected to a group of battery cells and a connector connected to an external load, an external charger, or another group of battery cells, is improved such that the connection structure may be simplified, the number of components and cost may be reduced, and the reliability of an electrical connection may be improved.

It is to be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as set forth in the following claims.

What is claimed is:

1. A battery pack comprising a battery cell, an input/output terminal to/from which a charging/discharging current of the battery cell is to be inputted/outputted, a connector detachably connected to the input/output terminal; and an elastic connection member arranged between the input/output terminal and the connector, wherein
the input/output terminal comprises a base portion, a first hollow conductive member protruding from the base portion in a first direction, and a second hollow conductive member protruding from the base portion to surround an outer periphery of the first hollow conductive member, the connector comprises a central guide protruding in a second direction opposite to the first direction, and a third hollow conductive member protruding to surround an outer periphery of the central guide, the central guide is fitted into a hollow portion of the first hollow conductive member, and the third hollow conductive member is fitted into a space between the first and second hollow conductive members and is electrically connected to the first and second hollow conductive members by the elastic connection member arranged in the space between the first and second hollow conductive members such that the elastic connection member contacts each of an outer circumferential surface of the first hollow conductive member and an inner circumferential surface of the third hollow conductive member and further contacts each of an inner circumferential surface of the second hollow conductive member and an outer circumferential surface of the third hollow conductive member.

2. A battery pack comprising a battery cell, an input/output terminal to/from which a charging/discharging current of the battery cell is to be inputted/outputted, and a connector detachably connected to the input/output terminal, wherein the input/output terminal comprises a first hollow conductive member protruding in a first direction and a second hollow conductive member protruding to surround an outer periphery of the first hollow conductive member, the connector comprises a central guide protruding in a second direction opposite to the first direction, and a third hollow conductive member protruding to surround an outer periphery of the central guide, the central guide is fitted into a hollow portion of the first hollow conductive member, the third hollow conductive member is fitted into a space between the first and second hollow conductive members and is electrically connected to the first and second hollow conductive members by an elastic connection member arranged in the space, and the elastic connection member comprises a disk member and an inner ring elastic piece and an outer ring elastic piece protruding from an inner ring and an outer ring of the disk member, respectively, in the first direction.

3. The battery pack of claim 2, wherein the inner ring elastic piece comes into contact with an outer circumference of the first hollow conductive member and an inner circumference of the third hollow conductive member, and the outer ring elastic piece comes into contact with an outer circumference of the third hollow conductive member and an inner circumference of the second hollow conductive member.

4. The battery pack of claim 3, wherein elastic contact portions are bent so as to protrude toward the outer circumference of the first hollow conductive member or the inner circumference of the third hollow conductive member in a longitudinal direction of the inner ring elastic piece.

5. The battery pack of claim 3, wherein elastic contact portions are bent so as to protrude toward the outer circumference of the third hollow conductive member or the inner circumference of the second hollow conductive member in a longitudinal direction of the outer ring elastic piece.

6. The battery pack of claim 2, wherein the disk member comprises a connection piece between the inner ring and the outer ring of the disk member so as to connect therebetween.

7. The battery pack of claim 6, wherein the connection piece comes into contact with a longitudinal cross-section of the third hollow conductive member in the second direction.

8. The battery pack of claim 6, wherein the connection piece comprises an elastic contact portion having a protruding shape between the inner ring and the outer ring of the disk member.

9. The battery pack of claim 6, wherein the inner ring elastic piece, the outer ring elastic piece, and the connection piece of the elastic connection member are integrally formed as a strip member.

10. The battery pack of claim 9, wherein, while consecutively surrounding the inner ring and the outer ring arranged in a concentric circular shape, the strip member forms the connection piece between the inner ring and the outer ring, the inner ring elastic piece that is bent to surround the inner ring from the connection piece and protrudes in the first direction, and the outer ring elastic piece that is bent to surround the outer ring from the connection piece and protrudes in the first direction.

11. The battery pack of claim 2, wherein a cutting portion is formed at a position in a circumferential direction of the disk member.

12. The battery pack of claim 1, wherein an insulating protective cap is arranged at an end portion of the central guide in the second direction.

13. The battery pack of claim 12, wherein the end portion of the central guide or an end of the protective cap protrudes further than an end portion of the third hollow conductive member in the second direction.

14. The battery pack of claim 1, wherein, in the connector and the input/output terminal approaching each other in the first and second directions relative to each other, after the central guide of the connector is fitted into the hollow portion of the first hollow conductive member of the input/output terminal, the third hollow conductive member of the connector is fitted into the space between the first and second hollow conductive members of the input/output terminal.

15. The battery pack of claim 1, wherein the input/output terminal further comprises an insulating housing that surrounds an outer periphery of the second hollow conductive member and has a coupling portion for sliding coupling with the connector thereon.

16. The battery pack of claim 15, wherein the coupling portion comprises a pair of coupling portions at two positions facing each other in a circumferential direction of the insulating housing.

17. The battery pack of claim 15, wherein the connector further comprises an insulating cap that surrounds an outer periphery of the third hollow conductive member and comprises a lever member for detachable coupling with the input/output terminal.

18. A battery pack comprising a battery cell, an input/output terminal to/from which a charging/discharging current of the battery cell is to be inputted/outputted, and a connector detachably connected to the input/output terminal, wherein the input/output terminal comprises a first hollow conductive member protruding in a first direction and a second hollow conductive member protruding to surround an outer periphery of the first hollow conductive member, the connector comprises a central guide protruding in a second direction opposite to the first direction, and a third hollow conductive member protruding to surround an outer periphery of the central guide, the central guide is fitted into a hollow portion of the first hollow conductive member, the third hollow conductive member is fitted into a space between the first and second hollow conductive members and is electrically connected to the first and second hollow conductive members by an elastic connection member arranged in the space, the input/output terminal further comprises an insulating housing that surrounds an outer periphery of the second hollow conductive member and has a coupling portion for sliding coupling with the connector thereon, the connector further comprises an insulating cap that surrounds an outer periphery of the third hollow conductive member and comprises a lever member for detachable coupling with the input/output terminal, and the lever member comprises a pair of lever members at facing positions in a circumferential direction of the insulating cap and corresponding to the coupling portion of the insulating housing.

19. The battery pack of claim 17, wherein the lever member comprises a first end on which an operation portion is formed, a second end on which a coupling hook fitted into a locking jaw of the insulating housing according to an operation of the operation portion is formed, and a hinge portion between the operation portion at the first end and the coupling hook at the second end, and the operation portion comprises a pair of operation portions, the coupling hook comprises a pair of coupling hooks, and the pair of operation portions at the first end and the pair of coupling hooks at the second end approach or retreat in opposite directions with respect to the hinge portion.

20. The battery pack of claim 19, wherein the lever member is separated from a main body of the insulating cap through a cutting portion and is connected to the main body of the insulating cap through the hinge portion.

21. The battery pack of claim 1, wherein the connector further comprises a base portion, the central guide and the third hollow conductive member protrude from the base portion of the connector in the second direction, and a screw member coupling the base portion of the connector and a conductive bar protrudes from the base portion of the connector in the first direction.

22. The battery pack of claim 21, wherein the conductive bar forms a charge/discharge path on which a charging/discharging current is to flow between a plurality of battery cells and an external load, an external charger, or another plurality of battery cells.

* * * * *